US007586831B2

(12) United States Patent
Verboom et al.

(10) Patent No.: US 7,586,831 B2
(45) Date of Patent: Sep. 8, 2009

(54) AMPLITUDE MODULATED ADDRESSING IN DISK PREGROOVE

(75) Inventors: Johannes J. Verboom, Colorado Springs, CO (US); Kurt W. Getreuer, Colorado Springs, CO (US)

(73) Assignee: Alliance Storage Technologies, Inc., Colorado Springs, CO (US)

( * ) Notice: Subject to any disclaimer, the term of this patent is extended or adjusted under 35 U.S.C. 154(b) by 794 days.

(21) Appl. No.: 11/085,721

(22) Filed: Mar. 21, 2005

(65) Prior Publication Data

US 2006/0209663 A1  Sep. 21, 2006

(51) Int. Cl.
*G11B 7/24* (2006.01)
(52) U.S. Cl. ............... 369/275.3; 369/59.25; 369/53.34
(58) Field of Classification Search ............... 369/275.3, 369/275.1, 275.2
See application file for complete search history.

(56) References Cited

U.S. PATENT DOCUMENTS

| 5,126,991 | A | * | 6/1992 | Verboom ................. 369/59.25 |
| 5,933,411 | A | | 8/1999 | Inui et al. |
| 5,940,364 | A | | 8/1999 | Ogata et al. |
| 5,999,504 | A | | 12/1999 | Aoki |
| 6,115,353 | A | | 9/2000 | Horie et al. |
| 6,122,739 | A | | 9/2000 | Kutaragi et al. |
| 6,201,773 | B1 | | 3/2001 | Aoki |
| 6,292,458 | B1 | * | 9/2001 | Eguchi et al. ............. 369/275.3 |
| 6,298,021 | B2 | | 10/2001 | Aoki |
| 6,324,136 | B1 | * | 11/2001 | Yoshida et al. ........... 369/47.22 |
| 6,393,596 | B1 | | 5/2002 | Fischer et al. |
| 6,473,377 | B2 | | 10/2002 | Eguchi et al. |
| 6,498,775 | B1 | * | 12/2002 | Fan et al. .................... 369/94 |
| 6,587,428 | B2 | * | 7/2003 | Kuribayashi ............. 369/275.4 |
| 6,671,238 | B1 | | 12/2003 | Ko et al. |
| 6,690,641 | B2 | | 2/2004 | Miyamoto et al. |
| 6,738,342 | B2 | | 5/2004 | Furumiya et al. |
| 6,744,718 | B1 | | 6/2004 | Ko et al. |
| 6,791,921 | B2 | * | 9/2004 | Maeda et al. ............. 369/47.28 |
| 7,133,331 | B2 | * | 11/2006 | Kondo et al. ............. 369/44.13 |

(Continued)

*Primary Examiner*—Peter Vincent Agustin
*Assistant Examiner*—Jesse Hauck
(74) *Attorney, Agent, or Firm*—Oppenheimer Wolff & Donnelly LLP

(57) ABSTRACT

In order to help maximize the capacity of an optical storage device, and increase the efficiency of addressing, a unique addressing scheme is utilized to provide addressing for an optical storage disk. Importantly, this scheme is compatible with multilayer disks and helps to minimize the potential for errors. In the addressing scheme of the present invention, the storage media is provided with a wobbled groove, which includes addressing information for the media. More specifically, the surface of the media is divided into predetermined sections, or portions, each portion having a selected number of wobble periods. Within these wobble periods, the amplitude of one single wobble period is either reduced or eliminated. The location of this reduced or eliminated wobble signal can then be determined by the readout system of the present invention and utilized to provide addressing information. A look-up table is provided, which includes a corresponding address value for each predetermined wobble period within a defined address frame. By determining the location of the zero or reduced wobble period within the address frame, an address value can be determined by that particular frame period by providing a number of frames adjacent to one another, a specific address is provided. Utilizing this mechanism, robust detection is provided since a differential detection can be easily utilized, and complex modulation techniques are not required.

24 Claims, 5 Drawing Sheets

U.S. PATENT DOCUMENTS

| | | | |
|---|---|---|---|
| 7,184,391 B2 * | 2/2007 | Lee et al. | 369/275.4 |
| 2002/0172122 A1 * | 11/2002 | Choi et al. | 369/275.3 |
| 2003/0137911 A1 | 7/2003 | Nakao et al. | |
| 2004/0105365 A1 | 6/2004 | Furumiya et al. | |
| 2006/0098564 A1 * | 5/2006 | Sugiyama et al. | 369/275.3 |

* cited by examiner

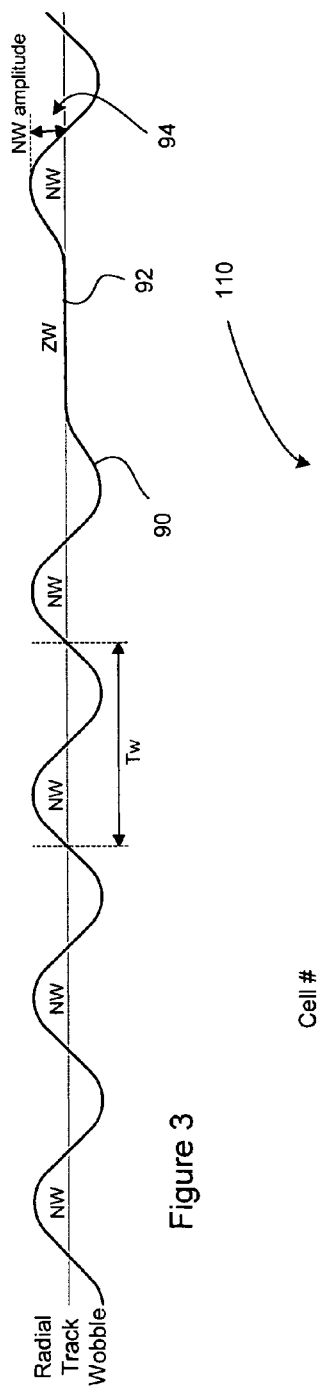
Figure 3
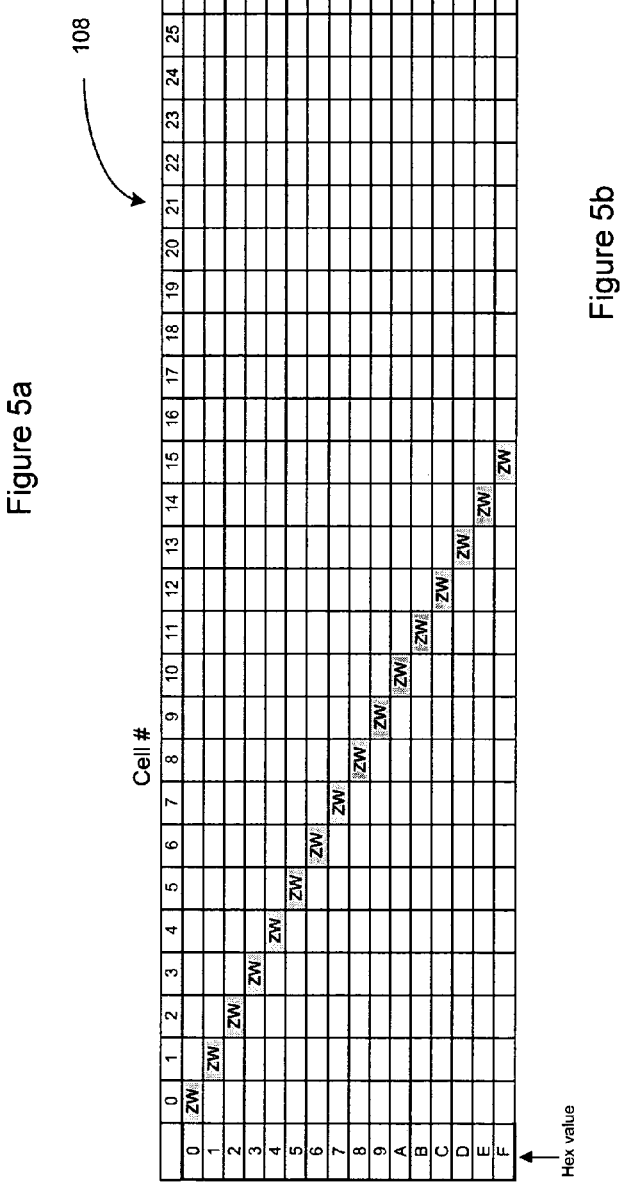
Figure 5a
Figure 5b

AMPLITUDE MODULATED ADDRESSING IN DISK PREGROOVE

BACKGROUND OF THE INVENTION

The present invention relates to optical data storage disks, commonly used in the data storage and data processing industry. More specifically, the present invention provides an addressing scheme for optical storage disks, which provides for fast addressing and efficient use of disk space.

As suggested above, optical disks are widely used in the data storage industry for various data storage needs due to their versatility and potential high capacities. Examples of such disks include the well-known compact disks (CD), DVD and other optical disks. Within each of these disk types are further variations including writable (or write-once), read only, or rewritable. In each case, the media includes a surface having optical properties that can be easily modified, either by a drive system or during mass production. These modifications are then recognizable when a light source is directed toward the surface of the media.

As with all data storage media, there is a constant pressure and desire to increase data storage capacity. It is well known that the data storage needs are drastically increasing as computer programs and systems become more and more complex. One mechanism for increased data storage is to increase the density of the storage media itself. Naturally, if density increases, capacity on a single piece of storage media will increase without adding additional space. While attempting to increase density on the surface of storage media, it is also necessary to maintain the reliability and repeatability of the storage media. That is, the data should be reliably recorded such that it can be easily and reliably recreated when necessary.

In setting up and managing the space available on the surface of storage media, one consideration is the allocation of addressing space versus data storage space. Addressing and synchronization areas are often required for efficient operation, however they require the use of space on the storage media. Naturally, it is desirable to minimize addressing space wherever possible, thus providing additional space for storing data. Maximizing the space available for data storage increases the density and storage capacity of the media.

One common method of addressing utilized in the optical storage industry is the use of pre-pits positioned at appropriate locations during manufacturing of the disk. These pre-pits are often permanent physical alterations to the media surface, which are detectable. The surface area on the media itself is thus defined such that pre-pits are within a header section and undisturbed areas are provided at other locations for storage of data. Pre-pit addressing does require a certain amount of space on the media surface solely for addressing purposes. As mentioned, it is desirable to minimize the amount of space used for this purpose.

In an effort to increase storage density, and thus capacity, multiple layered storage disks are sometimes used. These disks are constructed to have multiple semi-transparent layers, which can be accessed or identified using appropriate focusing mechanisms and optical components. While multilayer disks are certainly an efficient way to increase density, they create challenges when attempting to devise addressing schemes. This is specifically true when considering the use of pre-pits for addressing, as pre-pit addressing structures can create interference when attempting to access multiple layers on the disk.

As an alternative to pre-pit addressing, wobble structures have been utilized to achieve addressing as well. As is known by those skilled in the art, the surface of an optical storage media will often include a plurality of grooves to allow for easy tracking on the surface of the media. These structures are often referred to as the land and groove portions, which are easily detectable by optical components within the storage drive itself. In certain circumstances, these land and groove portions are "wobbled" or sinusoidal in order to provide additional benefits to the storage media. In one case, these wobbled tracks can then be used for synchronization purposes when writing to and reading from the media itself. Alternatively, these wobble tracks have been used for addressing schemes. In one example, one wall of the groove track is provided with address information. In another example, the wobbles are frequency modulated with address information. The optical systems and readout mechanisms can then detect the placement of these wobbled signals and decode an address there from. These schemes, known as addressing in pre-groove, provide an efficient method of addressing; however, do not necessarily make efficient use of disk space. More specifically, addressing in pre-groove often requires the use of large areas to exclusively provide addressing schemes. In addition, these schemes require complex decoding systems including sampling systems very similar to those used in reading data. The complexity of these systems often create the potential for errors in addressing.

In order to efficiently manage disk space, it is thus desirable to develop a mechanism for addressing that is more efficient and more reliable.

BRIEF SUMMARY OF THE INVENTION

The present invention provides an addressing scheme which efficiently utilizes disk space and is easily incorporated on multilayer disks. Utilizing this addressing methodology, no pre-pits are provided on the disk surface for addressing. Rather, information is embedded in the wobbled groove to provide both synchronization and addressing to a drive. Because the pre-pits are eliminated, multilayer data storage is easily accomplished and the aforementioned interference issues are eliminated. In addition, the addressing scheme of the present invention eliminates the need for complex sampling and monitoring of the wobbled groove as addressing is fairly easily detected.

As suggested above, the wobbled groove is used by the drives to provide synchronization when reading and writing. In order to provide addressing, an amplitude modulation scheme is incorporated into the wobbled groove, thereby efficiently using disk space and avoiding the use of pre-pits. Utilizing this amplitude modulation scheme, the address information can be derived easily and effectively.

In the addressing scheme of the present invention, an addressing field is defined in certain areas of the storage media. Within this addressing field, a specific section is further defined to constitute one addressing byte and to include a predetermined number of wobbles. Further, only a single cycle of this wobble structure within this section is amplitude modulated, thus being easily identifiable. As will be further described below, the location of this amplitude deviation is used to provide addressing to the media. Once the location of this amplitude modulation is determined, a look-up table can then be used to assign a value to that addressing byte. Naturally, putting together a number of these addressing bytes allows for complete addressing for the related portion of the storage media.

During fabrication of the media, a wobbled groove having a predetermined frequency is generally created. In order to manage information on the media, certain portions or sections of the wobbled groove are identified as address portions, and include a selected number of wobble cycles. These addressing sections are then broken down into a number of smaller addressing sections or addressing frames, again having a predetermined number of wobble cycles. Within each addressing frame, however, a single wobble cycle is provided having a modified amplitude. The location of this amplitude modified cycle within the address frame (i.e., the specific position of the amplitude modulation cycle within the address frame) in conjunction with a look-up table provides a data value, which correlates to this address frame. By combining the values for a string of consecutive address frames, a section address is derived.

Using the wobbled grooves as mentioned above also provides the ability to provide addresses repetition within a data sector. More specifically, the data section can be configured so that the actual address value can be expressed in only a portion of the available address frames, thus leaving space to repeat the address value. Having address repetition within a data sector provides a mechanism to deal with defects in the media. Further, address recovery is easily achieved whenever necessary.

As anticipated, the media incorporating this addressing scheme continues to use the wobble groove for synchronization during reading and writing. Further, as described in more detail below, certain modulated patterns of the wobble groove are specifically identified as synchronization frames and are used for specific synchronization updates. These synchronization frames can be easily identified by the storage system, when the disk is read, and are used to maintain readout synchronization. Consequently, the combination of synchronization frames with address frames provides usable and reliable addressing for the storage media.

As mentioned numerous times above, amplitude modification (or modulation) at predefined locations is utilized to provide disk addressing. Amplitude modulation provides many advantages when used in an addressing scheme such as this. Most importantly, differential detection can be utilized to locate the amplitude modulated cycle. This differential detection simply compares the various cycle amplitudes with their surrounding amplitude to determine an existing variation. More significantly, the use of slice levels is avoided thus eliminating that potential source of errors. All of these features result in an addressing methodology that is much more reliable and repeatable.

It is thus an object of the present invention to provide data storage media and a data storage system which utilizes an addressing scheme which is reliable and repeatable, thus minimizing addressing errors. Having such a repeatable/reliable addressing scheme increases the useable storage space on the media, and the storage density.

It is a further object of the present invention to provide data storage media and a data storage system wherein multiple layer media can be utilized to store and save information. Most importantly, the storage system must be able to read information from layers of the storage media without interference problems.

It is a further object of the present invention to maximize the storage space available for data storage on a storage media by creating an addressing scheme that utilizes a relatively small amount of disk space. More importantly, the relationship of addressing space to data storage space must be minimized (i.e., small portions of the media utilized for addressing).

It is a further object of the present invention to provide an addressing scheme, which provides for easy address detection and avoids the requirements of complex decoding systems. By using an addressing mechanism that is easily detected, the possibility of errors is greatly reduced.

BRIEF DESCRIPTION OF THE DRAWINGS

FIG. 3 is a schematic illustration showing a first embodiment of a portion of the wobble signal;

FIG. 5a is a table illustrating the look-up values utilized to identify the synchronization blocks for the sector;

FIG. 5b is a table illustrating the look-up values used to encode addressing data;

DETAILED DESCRIPTION OF THE INVENTION

Figure 1:
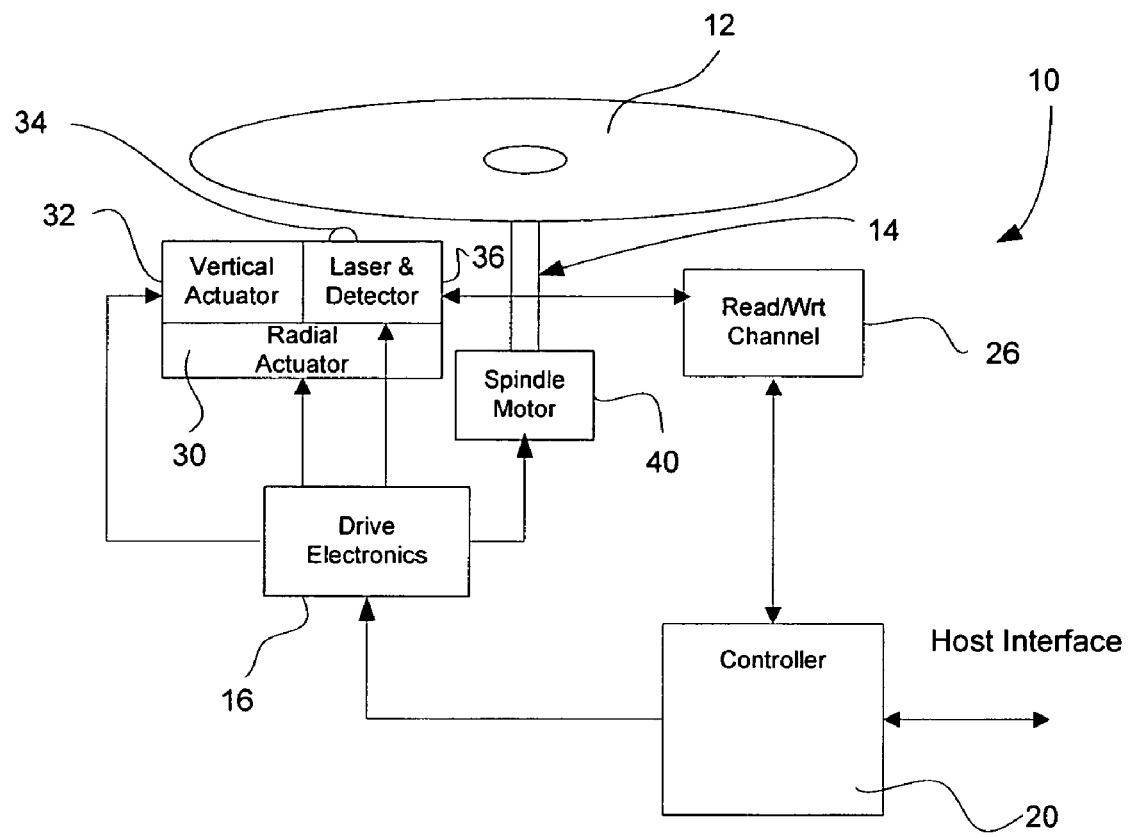
FIG. 1 is an overview of an exemplary data storage system utilizing the storage format of the present invention.

The present invention relates a data storage system which utilizes an optical storage media. While the data storage system can take many forms, one exemplary system is shown in FIG. 1. More specifically, the data storage system 10 utilizes a storage media 12 which, as mentioned, is an optical storage device. The use of optical storage media 12 has become well known and widely used in the industry because of its data storage capabilities and ease of access. In the present invention, the data storage media 12 is preferably removable, however could also be fixed within storage system 10. Storage media 12 is operably attached via a drive shaft 14 to spindle motor 40. The drive shaft 14 is driven by spindle motor 40 which is controlled by drive electronics 16. Cooperating with drive electronics 16 are a laser assembly 36 including the laser itself (not shown), optics (not shown), and detection circuitry (not shown). Attached to laser assembly 36 are a radial actuator 30 and a vertical actuator 32 to provide appropriate movement and positioning. A lens 34 focuses a laser beam toward the desired region on media 12.

Laser assembly 36 is also connected to a read/write channel 26 for transferring the appropriate signals to and from the media 12. Similarly, read/write channel 26 is attached to controller 20 which coordinates the overall operation of storage system 10. Laser assembly 36 includes a typical split detector (not shown) used for tracking on the media 12. As further outlined below, this split detector provides a signal indicative of the structure present on the surface of media 12, including the wobble structure mentioned above.

Referring specifically now to media 12, the desired data storage structure of the present invention is incorporated therein. As is well known, many forms of optical media exist. Generally, these forms provide for variations in the optical properties (e.g., reflectance) due to either physical construction or selective exposure to light. Once the optical properties are changed, they can be easily detected by directing a light source on the media and detecting the response. In this way, changes to the properties of the media represent data that can be written to and read from the storage media in a convenient and efficient manner.

With any data storage media, a complication exists in the addressing and management of data. Historically, certain sections or areas of the media surface have been identified as addressing sectors, while other sectors are identified as data sectors. In the systems, the addressing sectors were examined and interrogated to determine the particular address for that location, and corresponding data would then be written to or read from the related data storage area. While efficient for most operations, certain complications do exist in this structure. In light of these complications, the present addressing scheme has been developed.

Figure 7:
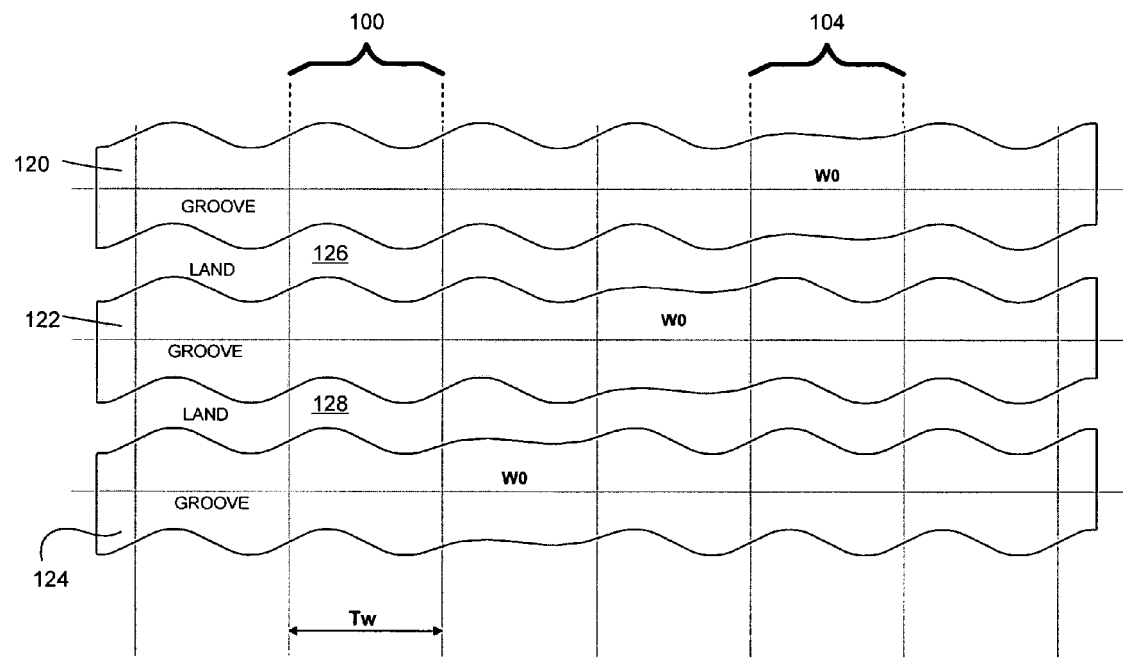
FIG. 7 is yet another layout drawing schematically illustrating the actual land and groove tracks of one embodiment of the invention.

In order to deal with the coordination of data on the media surface, synchronization is an on-going concern. More specifically, synchronization is required for both reading and writing operations. One common scheme to provide this necessary synchronization is to add a wobble signal to the media. As is well known, optical media often is configured to have a plurality of land and groove tracks. These tracks are typically formed by etching periodic grooves throughout the surface of the media. Wobbled groves are provided by creating a non-linear groove during the fabrication process. Most often, this structure is in a sinusoidal configuration, thus easily producing a periodic read-out signal which helps identify the physical rotation speed of the media. The periodic read-out signal is generated by the aforementioned split detector. In this case, the difference between the two detector elements is used to produce a wobble signal. Referring to FIG. 7, one example of a wobbled groove is shown. More specifically, a first wobbled groove 120, a second wobbled groove 122 and a third wobbled groove 124 are shown. Each groove (120, 122, 124) is separated by a land—here first land 126 or second land 128. The structure shown in FIG. 7 may be configured such that the groove is closer to the lens, or, such that the land is closer to the lens. As will be discussed in further detail below, this varied or wobbled groove is utilized by the present invention to maintain continuous synchronization and to provide addressing.

Figure 2:
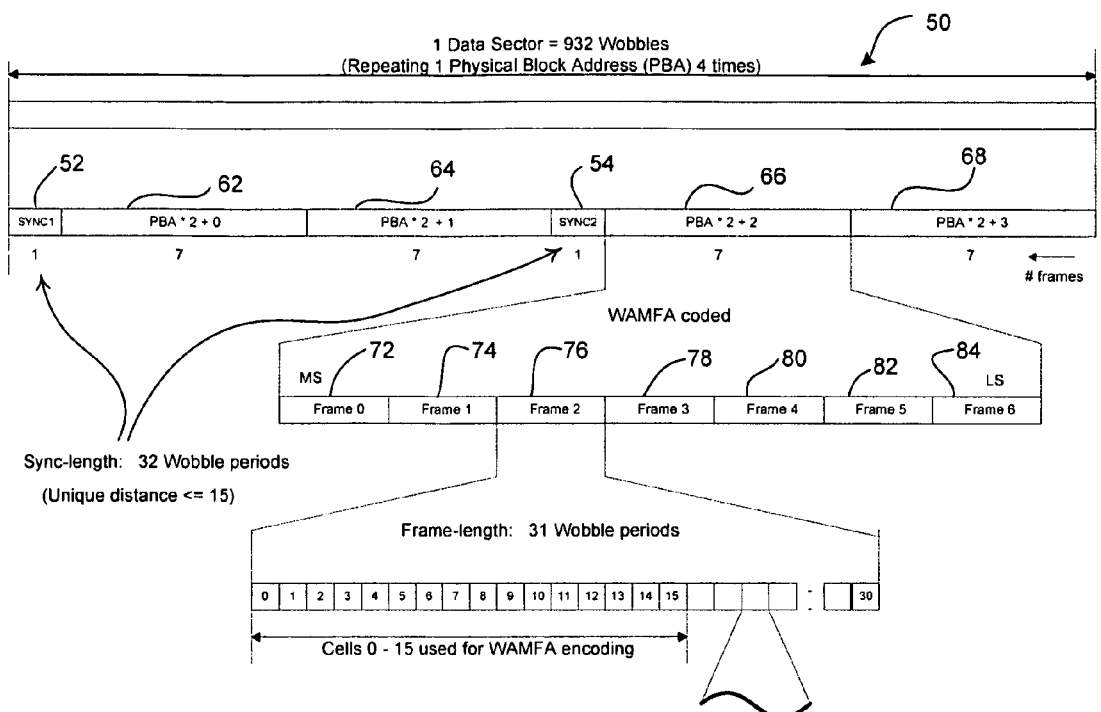
FIG. 2 is a layout drawing showing the sector format of the present invention.

In order to provide media organization, the addressing scheme of the present invention organizes various portions of the storage media into data sectors. The wobbled grooves are used to identify these sectors. Each data sector, or physical block address (PBA), is sized to contain an area of the media having a predefined number of groove wobbles. Referring now to FIG. 2, there is a schematic illustration showing the breakdown of a particular data sector 50. As will be understood, the particular media will contain a plurality of data sectors although only one is shown in FIG. 2. In this particular embodiment, each data sector is made up of 932 wobble periods. Each wobble period is configured to have 128 channel bits. As will be further outlined below, this configuration provides 8,192 user bytes per each sector.

In order to provide addressing for each sector, the wobble groove is encoded with the sector address in a predefined manner. More specifically, the 932 wobble periods are broken up into multiple frames in order to provide more identifiable and useable lengths. In this particular embodiment, the data sector is broken up into a first sync frame 52 and a second sync frame 54 and four address sections. The four address sections include a first address section 62, a second address section 64, a third address section 66, and a fourth address section 68.

Looking at the configuration slightly differently, the sector is broken into a plurality of frames (or nibbles). In this particular embodiment, 30 frames are used, made up of two different frame types. A first frame type is a sync frame, including first sync frame 52 and second sync frame 54. Each of the sync frames are configured to have 32 wobble periods and will be uniquely configured, as will be described below. Additionally, twenty-eight (28) address frames are included within the sector, each being 31 wobble periods in length. As can be seen in FIG. 2, the address frames are grouped to form four separate address sections or address blocks (e.g., first address section 62). Each address block will contain seven address frames, and includes the physical block address for the data sector. Stated alternatively, the physical block address is repeated four separate times within the sector. Each time the physical block address is repeated however, its least significant bit shifted to provide a separate identifiable address signal. As seen in FIG. 2, third address block 66 is broken out to illustrate the seven address frames included therein. In this case, included are a first address frame 72, second address frame 74, a third address frame 76, a fourth address frame 78, a fifth address frame 80, a sixth address frame 82, and a seventh address frame 84. As is further broken out in FIG. 2, each of the address frames includes 31 wobble periods. In this embodiment, the first 16 wobble periods are used for address decoding, while the remainder are not utilized. (Perhaps more accurately, the remaining wobble periods continue to be used for synchronization, however are not utilized for addressing purposes.) As mentioned above, each wobble period is one cycle of the wobble structure, thus covering a predetermined portion of the storage media.

As suggested above, in the embodiment of FIG. 2 the first 16 wobble periods of a particular address frame are utilized for addressing purposes. As will be further described below, these frames provide an encoded address value for each frame which, when combined, provide the physical block address for the particular data sector. As is understood, the actual data is stored on the grooves of the storage media itself, and is coordinated with addressing scheme to allow meaningful data storage and reproduction.

Again, each sector has its physical block address repeated four times. This redundancy allows the present addressing scheme to deal with imperfections in the media surface and potential readout errors. The wobbled grooves on the media are configured such that the least significant bit of each address is altered however, to provide unique identification within the sector. That is, the PBA is shifted by two places and the two least significant bits are replaced by a "0", "1", "2" or "3" to signify the first, second, third or fourth occurrences of the address, respectively. In this way, the actual address is easily determined by simply removing the two least significant bits and shifting appropriately.

In order to provide the above discussed addressing, the wobble structure of the present invention utilizes two different wobble structures. The typical or normal wobble structure involves a sinusoidal signal or structure which aids in alignment and synchronization. Referring to FIG. 3, this "typical structure" is illustrated as the normal wobble (NW) signal 90. In order to provide meaningful information, a second wobble structure is also utilized by the present invention. In one embodiment, the second structure is simply flat or zero wobble (ZW) signal 92, also shown in FIG. 3. As can be seen, NW signal 90 has an amplitude 94 which is identifiable and measurable. Conversely, the zero wobble signal 92 has no amplitude, thus can easily be differentiated during operation.

Figure 4:
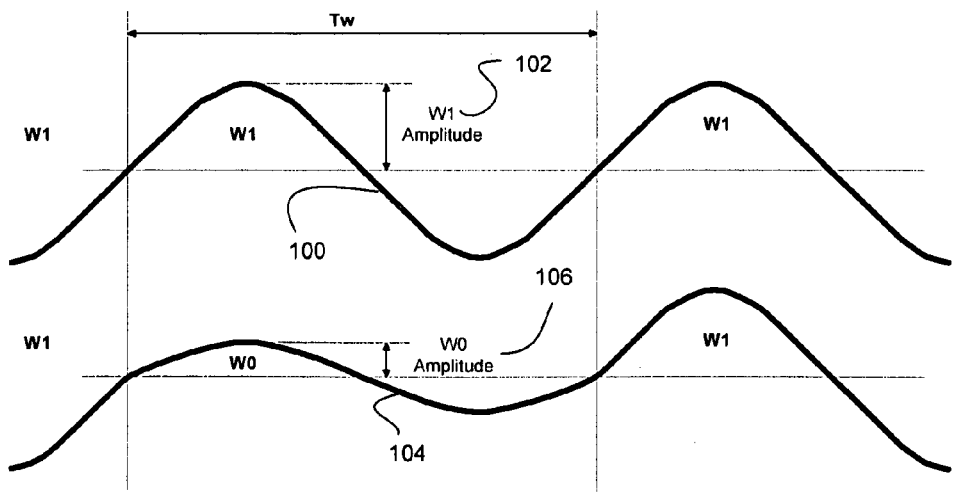
FIG. 4 is an illustration showing a second embodiment of the wobble signal.

An alternative embodiment is shown in FIG. 4 wherein a first wobble signal 100 has a first amplitude 102 while a second wobble signal 104 has a second amplitude 106. Again, the amplitude of a first wobble signal 100 and second wobble signal 104 are distinct from one another so they can easily be differentiated during operation. It should be noted that the use of two identifiable wobble signals greatly aids in the detection of these signals as differential detection can be used. Stated alternatively, no slice level is required, thus eliminating the possibilities for errors or mis-readings due to slice levels.

As mentioned above in relation to FIG. 2, each address frame contains 31 wobble periods. Each wobble period is identified in FIGS. 3 and 4 as time $T_w$. In order to provide meaningful addressing on the wobble signal, the frame is uniquely configured so that amplitude differences will exist for only predefined wobble periods within the frame. In the present embodiment, each wobble period within the frame is typically of a first amplitude, or normal amplitude 94. Addressing is then provided by placing the zero wobble (ZW) signal 92 at a predefined location within the frame. Consequently, once the entire frame is read, addressing information can be derived therefrom.

This concept is more fully understood by referring to FIG. 5b, which is a look-up table 110 illustrating the encoding methodology used. Examining the first 16 wobble periods of a particular frame will then identify the information encoded in that frame. By analyzing the first 16 wobble periods and identifying the location of the zero amplitude wobble or ZW period, the addressing system of the present invention can easily determine address information using look-up table 108. For example, if the system determines that the zero amplitude period (designated as "ZW" in FIG. 5b) is located in the seventh wobble period (or cell), the system will then determine that this is intended to be an address frame having a corresponding hexadecimal value of seven (7). Consequently, using look-up table 108, a value is assigned to each frame which can be easily determined by simply examining the wobble pattern. Again, the storage system of the present embodiment utilizes seven frames per address block, thus a seven-digit hexadecimal value can be obtained. This seven digit hexadecimal value will correspond to the sector address for that particular data sector. Again, as discussed above, in relation to FIG. 2, the actual addressing values are repeated four times, and identified separately utilizing the two least significant bits.

In addition to providing addressing, the scheme of the present invention also includes periodic synchronization frames. In the embodiment illustrated in FIG. 2, two synchronization frames are used within each sector. These frames are also shown in look-up table 110 of FIG. 5a. As indicated, the synchronization frames actually have zero amplitude or zero wobble (ZW) periods occurring twice within the first 16 wobble periods. More specifically, the first synchronization frame (sync 1) has a zero wobble (ZW) in cell one (1) and cell fifteen (15). Similarly, second synchronization (SF2) has a zero wobble (ZW) in cell three (3) and cell fifteen (15). Again, this structure is easily identified by the system of the present invention and is designated as a synchronization frame. This is possible because of the unique data pattern created when two zero amplitude wobble periods are located within the first 16 wobble periods of the frame.

Figure 6:
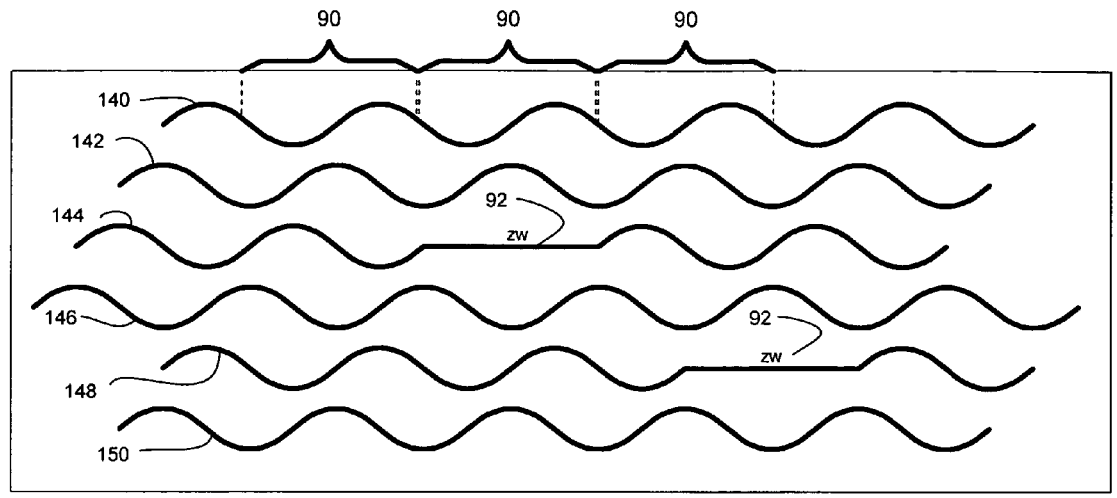
FIG. 6 is a layout drawing schematically illustrating multiple wobble tracks adjacent to one another.

In the embodiment of FIG. 7, the periods of adjacent tracks are aligned with one another, which provides consistency as adjacent tracks are read. Referring now to FIG. 6, a schematic illustration of groove tracks is shown, which utilizes a slightly different arrangement. In this particular embodiment, the normal wobble 90 and zero wobble (ZW) 92 structures are utilized. Schematically shown in this figure are six wobbled groove tracks—A first track (Track N) 140, a second track (Track N+1) 142, a third track (Track N+2) 144, a fourth track (Track N+3) 146, a fifth track (Track N+4) 148, and a sixth track (Track N+5) 150. As can be seen in this figure, wobbles at adjacent groove tracks are intentionally misaligned to be 90° out of phase with one another. In this instance, a single groove will then have the two grooves on either side being 180° out of phase with one another. For example, fifth track 148 is centered between fourth track 146 and sixth track 150. At any point the two surrounding tracks (fourth track 146 and sixth track 150) are 180° out of phase with one another, and are 90° out of phase with fifth track 148. This structure is specifically implemented to reduce or eliminate cross-talk or crossover noise that may exist in reading a particular track. As is understood, crossover noise comes from adjacent tracks on the media. In this case, crossover noise from the two adjacent tracks will be 180° out of phase and should cancel one another (or greatly reduce their effects). Utilizing this structure, greater reliability in reading address information is achieved.

Figure 9:
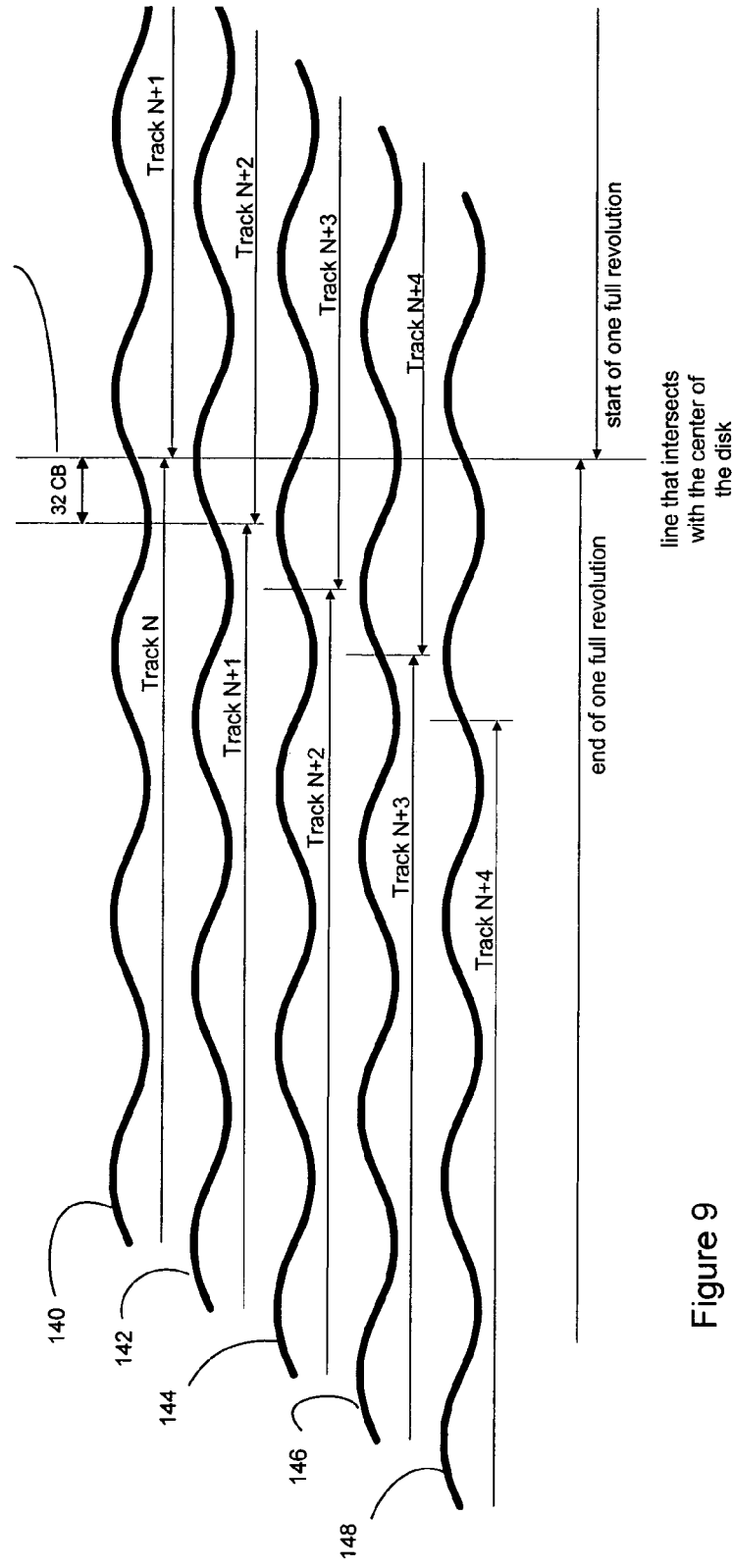
FIG. 9 is a layout drawing illustrating a number of adjacent tracks and their relationship to a common reference point on the media surface.

Referring now to FIG. 9, the wobbled groove structure of related tracks is further illustrated. More specifically, reference point 200 is illustrated which is intended to be a single line or location on the media surface itself. This illustration shows five of the tracks that were previously discussed in relation to FIG. 6. As can be seen, adjacent tracks are again misaligned with one another. This is because one particular track does not fill an entire rotation. Starting with track N 140 as a reference point, each subsequent track will end 32 channel bits before the end of the previous track. Specifically, track N+1 142 will end 32 channel bits before the end of track N; track N+2 144 will likewise end 32 channel bits before track N+1 142; etc. Using this structure, the above-mentioned intentional misalignment is achieved.

Figure 8:
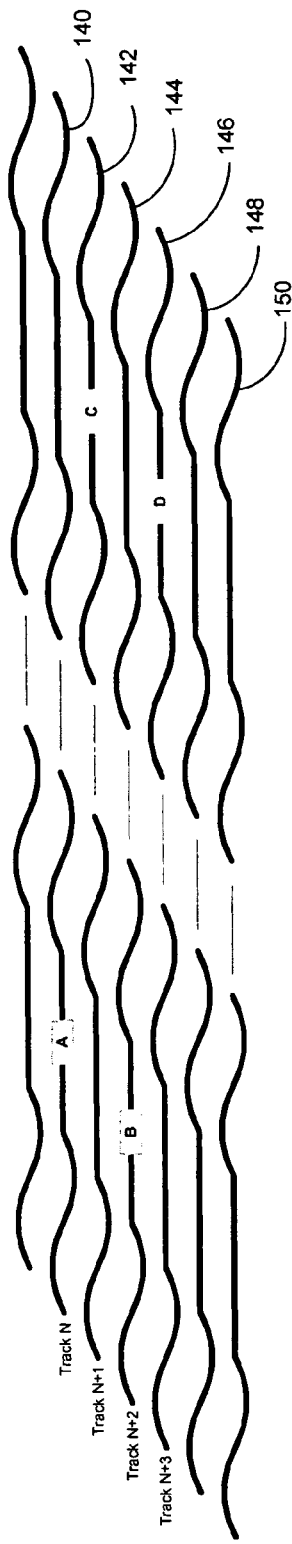
FIG. 8 is a schematic drawing illustrating quadrature wobble marks utilized by the present invention.

In addition to the many features illustrated above, the present invention also includes quadrature wobble marks as illustrated in FIG. 8. More specifically, FIG. 8 shows the same tracks as shown in FIGS. 6 & 9, but has the quadrature wobble marks inserted as blocks labeled as A, B, C, and D. Quadrature wobble marks are interruptions of the groove. As mentioned above, a split detector is utilized to generate the wobble signal from the media. A quadrature wobble mark (QWM) signal is produced by summing the signals of each detector element from this split detector. By sampling and storing the QWM signal for the blocks A, B, C and D, tracking offset correction techniques can be applied within the system. In this particular embodiment, each quadrature wobble mark is placed in a zero wobble (ZW) period.

The above embodiments of the present invention have been described in considerable detail in order to illustrate their features and operation. It is clearly understood however, that various modifications can be made without departing from the scope and spirit of the present invention.

What is claimed is:

1. An optical data storage medium, comprising:
   a medium substrate having a recording surface thereon with variable optical properties;
   a plurality of wobbled grooves preformed on the recording surface, the plurality of wobbled grooves having a repeating configuration wherein a wobble pattern is repeated at a predetermined frequency thus providing a wobble period for the wobbled groove, provided however that the wobble pattern has at least two different wobble amplitudes, including a first amplitude and a second amplitude;
   wherein the recording surface is logically divided into a plurality of designated data regions with each data region including a predetermined number of wobble patterns;
   wherein the designated data regions have a predetermined number of address cells, each address cell having a predetermined number of wobble periods;

wherein only one of the wobble periods within the address cell is a reduced wobble period having an amplitude substantially equal to the second amplitude, and wherein the remaining wobble periods have an amplitude substantially equal to the first amplitude to enable detection of the reduced wobble period with a differential detection technique; and wherein the reduced wobble period is positioned at a predetermined location within the address cell, and wherein the predetermined location is indicative of an address value for that address cell and the combined address values for a plurality of the address cells within the data region is indicative of the location on the storage media.

2. The optical storage medium of claim 1 wherein the media can be used with a look-up table such that the location of the reduced address cell corresponds to an address value listed on the table.

3. The optical storage medium of claim 1 wherein the second amplitude is substantially zero.

4. The optical storage medium of claim 1 further comprising synchronization frames within the data region, the synchronization frame having at least one wobble period having an amplitude equal to the second amplitude and wherein the wobble pattern of the synchronization frame is recognizable when compared with the address frames.

5. The optical storage medium of claim 1 wherein the plurality of wobbled grooves are formed on the substrate such that a first groove and a second groove are adjacent to one another, and wherein the wobble pattern of the first groove and the wobble pattern of the second groove are out of phase with one another.

6. The optical storage medium of claim 5 wherein the wobble pattern of the first groove and the wobble pattern of the second groove are 90 degrees out of phase with one another.

7. The optical storage medium of claim 1 wherein the wobbled groove further includes a periodic quadrature wobble mark.

8. A system for storing information, comprising:
an optical storage medium having:
a recording surface with a plurality of wobbled grooves thereon, with the wobbled grooves being of a predetermined frequency and having a selected wobble period,
the recording surface further having a plurality of data sectors defined thereon wherein each sector includes a predetermined number of wobble periods; and
each data sector including a plurality of frames wherein each frame includes a predetermined number of wobble periods and one selected wobble pattern, each selected wobble pattern including an amplitude variation for only one wobble period within the frame;
a readout system for cooperating with the storage medium to recognize the wobbled grooves and produce a wobble signal corresponding to the wobbled grooves;
a processor for receiving the wobble signal and determining the location of the amplitude variation within the frame using a differential detection technique; and
memory communicating with the processor for storing a lookup table which provides a unique value for the frame based upon the location of the amplitude variation.

9. The system of claim 8 wherein the amplitude variation is a wobble of zero amplitude for one wobble period.

10. The system of claim 8 wherein the selected wobble pattern includes a plurality of wobbles having a first amplitude and the amplitude variation is a wobble of a selected amplitude.

11. The system of claim 8 wherein the unique value for the frame represents an address value or a synch value for the frame.

12. The system of claim 11 wherein a selected number of address values corresponding to a selected number of frames combine to form an address value for the sector.

13. The system of claim 12 wherein the address value is repeated a plurality of times within the sector.

14. The system of claim 8 wherein the plurality of wobbled grooves on the recording surface are arranged such that a selected wobbled groove is out of phase with an adjacent wobbled groove.

15. The system of claim 14 wherein the selected wobbled groove is substantially 90 degrees out of phase with the adjacent wobbled groove.

16. The system of claim 11 wherein the frame including the synch value is designated as a synch frame.

17. The system of claim 16 wherein each data sector includes at least one synch frame.

18. The system of claim 8 wherein the plurality of wobbled grooves on the recording surface are arranged such that a selected wobbled groove is out of phase with a first adjacent wobbled groove and a second adjacent wobbled groove, wherein the first wobbled groove and the second wobbled groove are located on opposite sides of the selected wobbled groove and wherein the first adjacent wobbled groove and the second adjacent wobbled groove are substantially 180 degrees out of phase with one another.

19. A method for storing and reproducing data comprising:
providing a storage medium having a data storage surface which has optical properties that can be varied, and which includes a plurality of wobbled grooves, wherein the wobbled grooves have periodic variations of a predefined frequency;
arranging the plurality of wobbled grooves into a plurality of frames, with the frames including a predetermined number of wobble periods;
grouping the frames so as to create an address block made up of a predetermined number of frames;
providing a variation in the amplitude of the wobbled grooves at only one selected location within each of the plurality of frames;
determining the location of the variation within each of the frames using a differential detection technique;
using a lookup table to determine a coded value for each frame; and
combining the coded value for each frame within the address block wherein the combination of values forms an address for the address block.

20. The method of claim 19 wherein a plurality of address blocks are combined to form a data sector.

21. The method of claim 20 wherein the data sector includes four address blocks, and each address block contains the address of the data sector.

22. The method of claim 21 wherein the address block also contains an identifier to differentiate each address block within the data sector.

23. The method of claim 20 wherein the data sector includes a predetermined number of address blocks, with each address block containing the data sector address and an identifier.

24. The method of claim 19 further comprising the step of defining a plurality of frames to be synchronization frames.

* * * * *

UNITED STATES PATENT AND TRADEMARK OFFICE
CERTIFICATE OF CORRECTION

PATENT NO. : 7,586,831 B2 Page 1 of 1
APPLICATION NO. : 11/085721
DATED : September 8, 2009
INVENTOR(S) : Verboom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1176 days.

Signed and Sealed this

Twenty-first Day of September, 2010

David J. Kappos
*Director of the United States Patent and Trademark Office*